United States Patent
Yokoyama et al.

(10) Patent No.: US 9,718,968 B2
(45) Date of Patent: Aug. 1, 2017

(54) WATERBORNE COATING COMPOSITION CONTAINING BIO-RESOURCED POLYTRIMETHYLENE ETHER POLYOL

(71) Applicant: AXALTA COATING SYSTEMS IP CO., LLC, Wilmington, DE (US)

(72) Inventors: Ayumu Yokoyama, Wallingford, PA (US); Hari Babu Sunkara, Hockessin, DE (US); Rajesh Gopalan Saliya, Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 93 days.

(21) Appl. No.: 14/364,669

(22) PCT Filed: Dec. 12, 2012

(86) PCT No.: PCT/US2012/069198
§ 371 (c)(1),
(2) Date: Jun. 11, 2014

(87) PCT Pub. No.: WO2013/090398
PCT Pub. Date: Jun. 20, 2013

(65) Prior Publication Data
US 2014/0356631 A1    Dec. 4, 2014

Related U.S. Application Data

(60) Provisional application No. 61/569,448, filed on Dec. 12, 2011.

(51) Int. Cl.
*C09D 7/12* (2006.01)
*B05D 7/00* (2006.01)
*C08G 18/42* (2006.01)
*C09D 175/04* (2006.01)
*C08G 18/48* (2006.01)

(52) U.S. Cl.
CPC .............. *C09D 7/125* (2013.01); *B05D 7/57* (2013.01); *C08G 18/4205* (2013.01); *C08G 18/4841* (2013.01); *C09D 175/04* (2013.01); *B05D 2508/00* (2013.01); *Y10T 428/31551* (2015.04)

(58) Field of Classification Search
CPC .. B05D 2508/00; B05D 7/57; C08G 18/4205; C08G 18/4841; C09D 175/04; C09D 7/125; Y10T 428/31551
USPC .......... 428/423.1; 524/377; 427/385.5, 407.1
See application file for complete search history.

(56) References Cited

U.S. PATENT DOCUMENTS

| | | | |
|---|---|---|---|
| 7,169,475 B2 | 1/2007 | Sormani et al. | |
| 7,910,644 B2 | 3/2011 | Saliya et al. | |
| 2006/0142473 A1 | 6/2006 | Sunkara et al. | |
| 2006/0155146 A1* | 7/2006 | Lenges et al. | .................. 564/32 |
| 2007/0028806 A1* | 2/2007 | Piro et al. | ...................... 106/446 |
| 2008/0039582 A1* | 2/2008 | Sunkara | ............. C08G 18/0823 524/840 |
| 2011/0052919 A1 | 3/2011 | Yokoyama et al. | |
| 2011/0052920 A1 | 3/2011 | Yokoyama et al. | |
| 2011/0165423 A1 | 7/2011 | Ma et al. | |
| 2011/0257330 A1 | 10/2011 | Yokoyama et al. | |
| 2013/0040149 A1* | 2/2013 | Yokoyama et al. | ....... 428/423.3 |

FOREIGN PATENT DOCUMENTS

| | | |
|---|---|---|
| WO | 2010078232 A1 | 7/2010 |
| WO | 2011143277 A1 | 11/2011 |

OTHER PUBLICATIONS

SIPO, Chinese Office Action issued in Application No. 201280069532, dated Aug. 27, 2015.
DPMA, German Examination Report issued in Application No. 112012005181.5, dated Sep. 3, 2015.
ISA Korean Intellectual Property Office, International Search Report and Written Opinion for International Application No. PCT/US2012/069198, dated Mar. 28, 2013.
ISA Korean Intellectual Property Office, International Preliminary Report on Patentability for International Application No. PCT/US2012/069198, dated Jun. 26, 2014.

* cited by examiner

*Primary Examiner* — Thao T Tran
(74) *Attorney, Agent, or Firm* — Lorenz & Kopf LLP

(57) ABSTRACT

A coating composition having excellent adhesion between coating layers is provided. This disclosure is particularly directed to a 1K waterborne coating composition having hydrophobic polytrimethylene ether polyol containing crosslinkable functional hydroxyl groups. The 1K waterborne coating composition can be used in a multi-layer coating that can comprise a primer layer, a basecoat layer, and optionally, a clearcoat layer. The 1K waterborne coating composition of this disclosure can provide improved adhesion between coating layers, such as between a primer layer and a basecoat layer, between two or more basecoat layers, or between a basecoat layer and a clearcoat layer. This disclosure is further directed to a coating composition comprising components derived from renewable resources.

20 Claims, No Drawings

WATERBORNE COATING COMPOSITION CONTAINING BIO-RESOURCED POLYTRIMETHYLENE ETHER POLYOL

CROSS REFERENCE TO RELATED APPLICATION

This application is a U.S. National-Stage entry under 35 U.S.C. §371 based on International Application No. PCT/US2012/069198, filed Dec. 12, 2012 which was published under PCT Article 21(2) and which claims priority to U.S. Provisional Application No. 61/569,448, filed Dec. 12, 2011, which are all hereby incorporated in their entirety by reference.

TECHNICAL FIELD

The present disclosure is directed to a coating composition having excellent adhesion between coating layers, especially between a primer layer and a basecoat layer. This disclosure is further directed to a coating composition comprising components derived from renewable resources.

BACKGROUND

A typical coating finish over a substrate can comprise some or all of the following layers: (1) one or more primer layers that provide adhesion and basic protection, such as corrosion protection; (2) one or more colored layers (also known as basecoat layers), typically pigmented, that provide most of the protection, durability and color; and (3) one or more clearcoat layers that provide additional durability and improved appearance. A colored topcoat layer can be used in place of the colored layer and the clearcoat layer. A suitable primer, primer surfacer or primer filler, collectively referred to as "primer" herein, can be applied over the substrate to form the primer layer.

Adhesion between coating layers is a challenge in the industry. Accordingly it is desirable to provide coatings having improved inter-coating layer adhesion. In addition, other objects, desirable features and characteristics will become apparent from the subsequent summary and detailed description, and the appended claims, taken in conjunction with the accompanying drawings and this background.

SUMMARY

This disclosure is directed to a coating composition comprising:
A1) a coating binder component comprising one or more film forming polymers;
A2) a polytrimethylene ether polyol having one or more crosslinkable functional hydroxyl groups;
wherein said polytrimethylene ether polyol is hydrophobic; said coating binder component comprises in a range of from about 20% to about 90% of water, percentage based on the total weight of the coating binder component; and
said coating composition is essentially free from crosslinking functional groups that react with said crosslinkable functional hydroxyl groups to form a crosslinked structure.

This disclosure is also directed to a multi-layer coating formed over a substrate, said multi-layer coating comprising:
B1) a first coating layer formed over said substrate from a first coating composition comprising:
A1) a coating binder component comprising one or more film forming polymers;
A2) a polytrimethylene ether polyol having one or more crosslinkable functional hydroxyl groups;
wherein said polytrimethylene ether polyol is hydrophobic; said coating binder component comprises in a range of from about 20% to about 90% of water, percentage based on the total weight of the coating binder component; and
said first coating composition is essentially free from crosslinking functional groups that react with said crosslinkable functional hydroxyl groups to form a crosslinked structure; and
B2) a second coating layer formed over said first coating layer from a second coating composition comprising:
(b1) a crosslinkable component comprising one or more subsequent film forming polymers comprising one or more subsequent crosslinkable functional groups;
(b2) a crosslinking component comprising one or more crosslinking functional groups that react with said crosslinkable functional hydroxyl groups and said subsequent crosslinkable functional groups;
wherein said one or more film forming polymers and said one or more subsequent film forming polymers are the same or different, and
said crosslinkable functional hydroxyl groups and said subsequent crosslinkable functional groups are the same or different.

This disclosure is further directed to a process for forming a multiplayer coating over a substrate, said process comprising the steps of:
C1) applying a first coating composition over said substrate to form a first coating layer, said first coating composition comprising:
A1) a coating binder component comprising one or more film forming polymers;
A2) a polytrimethylene ether polyol having one or more crosslinkable functional hydroxyl groups;
wherein said polytrimethylene ether polyol is hydrophobic; said coating binder component comprises in a range of from about 20% to about 90% of water, percentage based on the total weight of the coating binder component; and
said first coating composition is essentially free from crosslinking functional groups that react with said crosslinkable functional hydroxyl groups to form a crosslinked structure;
C2) applying a second coating composition over said first coating layer to form a second coating layer, said second coating composition comprising:
(b1) a crosslinkable component comprising one or more subsequent film forming polymers comprising one or more subsequent crosslinkable functional groups;
(b2) a crosslinking component comprising one or more crosslinking functional groups that react with said crosslinkable functional hydroxyl groups and said subsequent crosslinkable functional groups;
wherein said one or more film forming polymers and said one or more subsequent film forming polymers are the same or different, and
said crosslinkable functional hydroxyl groups and said subsequent crosslinkable functional groups are the same or different.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "two-pack coating composition" or "2K coating composition" refers to a coating composition having two packages that are stored in separate containers and sealed to increase the shelf life of the coating composition during storage. The two packages are mixed just prior to use to form a pot mix, which has a limited pot life, typically ranging from a few minutes (about 15 minutes to about 45 minutes) to a few hours (about 4 hours to about 8 hours). The pot mix is then applied as a layer of a desired thickness on a substrate surface, such as an automobile body. After application, the layer dries and cures at ambient or at elevated temperatures to form a coating on the substrate surface having desired coating properties, such as, adhesion, gloss, and DOI.

The term "one-pack coating composition" or "1K coating composition" refers to a coating composition having one package that can be stored for a certain shelf life. For example, a 1K coating composition can be a UV mono-cure coating composition that can be prepared to form a pot mix and stored in a sealed container. As long as the UV mono-cure coating composition is not exposed to UV radiation, the UV mono-cure coating composition can have indefinite pot life. Other examples of 1K coating composition can include 1K coating compositions having blocked crosslinking agent such as blocked isocyanates, moisture curing 1K coating compositions, oxygen curing 1K coating compositions, or heat curing 1K coating compositions as known in coating industry.

The term "crosslinkable component" refers to a component having "crosslinkable functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The term "crosslinking component" refers to a component having "crosslinking functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide or a workable combination thereof.

The term "dye" means a colorant or colorants that produce color or colors and is usually soluble in a coating composition.

The term "pigment" or "pigments" used herein refers to a colorant or colorants that produce color or colors and is usually not soluble in a coating composition. A pigment can be from natural and synthetic sources and made of organic or inorganic constituents. A pigment can also include metallic particles or flakes with specific or mixed shapes and dimensions.

The term "effect pigment" or "effect pigments" refers to pigments that produce special effects in a coating. Examples of effect pigments can include, but not limited to, light absorbing pigment, light scattering pigments, light interference pigments, and light reflecting pigments. Metallic flakes, for example aluminum flakes, can be examples of such effect pigments. Effect pigment can include "gonioapparent flakes", "gonioapparent pigment" or "gonioapparent pigments" that are pigment or pigments pertaining to change in color, appearance, or a combination thereof with change in illumination angle or viewing angle. Metallic flakes, such as aluminum flakes are examples of gonioapparent pigments. Interference pigments or pearlescent pigments can be further examples of gonioapparent pigments.

A substrate suitable for use herein can be a plastic, bare metal such as blasted steel, aluminum or other metal or alloys. One example of the blasted steel can be the one available from East Coast Steel Inc, Columbia, S.C. 29290, USA. The substrate can also be plastic or metal substrates with one or more existing coating layers. One example can be a steel substrate coated with an eletrocoat (e-coat) layer. Another example can be a steel substrate coated with an eletrocoat (e-coat) layer and a primer layer. Yet another example can be a steel substrate coated with a primer layer. Yet another example can be a steel substrate coated with a primer layer and a colored coating layer. In yet another example, the substrate can be a vehicle body or a part thereof.

The term "vehicle", "automotive", "automobile", "automotive vehicle", or "automobile vehicle" refers to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

One exemplary embodiment herein is directed to a coating composition. The coating composition can comprise:

A1) a coating binder component comprising one or more film forming polymers;

A2) a polytrimethylene ether polyol having one or more crosslinkable functional hydroxyl groups;

wherein said polytrimethylene ether polyol is hydrophobic;

said coating binder component comprises in a range of from about 20% to about 90% of water, percentage based on the total weight of the coating binder component; and said coating composition is essentially free from crosslinking functional groups that react with said crosslinkable functional hydroxyl groups to form a crosslinked structure.

The polytrimethylene ether polyol can have one or more crosslinkable functional hydroxyl groups in each molecule. In one example, the polytrimethylene ether polyol can be a polytrimethylene ether diol. In another example, the polytrimethylene ether polyol can be a branched polytrimethylene ether triol. In yet another example, the polytrimethylene ether polyol can include a branched copolyether polyol derived via condensation reaction from a monomer mixture comprising 1,3-propanediol and at least one triol comonomer selected from 1,1,1-trishydroxymethyl ethane, 1,1,1-trishydroxymethyl propane, or a combination thereof.

The polytrimethylene ether polyol suitable for this disclosure is hydrophobic that is not soluble in water. Water solubility of the polytrimethylene ether polyol is Mn dependent and the water solubility reduces upon increase in Mn. Typically, polytrimethylene ether polyols having Mn greater than about 500 can be hydrophobic, while polytrimethylene ether polyols having Mn less than about 500 can be hydrophilic. Water solubility of the polytrimethylene ether polyol can be determined by mixing equal volumes of a polytrimethylene ether polyol and water in a vial and then letting the vial stand still for a period of time in a range of from about 5 to about 20 minutes. If the polytrimethylene ether polyol and water separate into layers, then the polytrimethylene ether polyol can be determined as hydrophobic.

The coating composition can comprise in a range of from about 0.1% to about 10% of the polytrimethylene ether polyol, percentage based on the total weight of the coating composition.

As used herein throughout this disclosure unless specifically noted otherwise, by "essentially free from the crosslinking functional groups", the coating composition can have minor amounts of the crosslinking functional groups, such as isocyanate groups, as long as there are excess amounts of crosslinkable functional hydroxyl groups of the polytrimethylene ether polyol that are not reacted with the crosslinking functional groups in the coating composition. The coating composition can also be free from the crosslinking functional groups. The molar ratio of the crosslinking functional groups/crosslinkable functional hydroxyl groups of the polytrimethylene ether polyol can be in arrange of from 0 to about 0.5. Weight ratio can be calculated based on factors such as molecular weight of the compound or Mn (number average molecular weight) or Mw (weight average molecular weight) if the compound is a polymer, the number of functional groups per molecule, molar concentration, and specific weight of the coating composition. In one example, the coating composition can comprise about 0.057 M (mole/liter) of the polytrimethylene ether polyol, such as about 10% (weight percent) of a polytrimethylene ether diol having about Mn 2000 and in a range of from 0 M to about 0.028 M of compounds having two crosslinking functional groups, such as in a range of from 0% to about 0.4% (weight percent) of 1,6-hexamethylene diisocyanate (HDI), in a coating composition that has a specific weight of about 1.2 kg/liter. In yet another example, the coating composition is free from the crosslinking functional groups.

The polytrimethylene ether polyol can have a Mn in a range of from about 500 to about 10,000. The polytrimethylene ether polyol can have a Tg of about −77° C. The polytrimethylene ether polyol can have a hydroxyl number in a range of from 10 to 225. The polytrimethylene ether polyol can have a Mn of about 500 to about 10,000 in one example, a Mn of about 500 to about 8,000 in another example, a Mn of about 500 to about 6,000 in yet another example, a Mn of about 500 to about 4,000 in yet another example, a Mn of about 500 to about 3,000 in yet another example, and a Mn of about 500 to about 2000 in a further example. In a particular example, the polytrimethylene ether polyol can have a Mn of about about 2,000.

The coating binder component can be a 1K waterborne coating composition. The coating composition can be a primer coating composition. In one example, the coating binder component can be a waterborne polyurethane copolymer primer, such as IMRON® 1.5 PR™ available from E. I. du Pont de Nemours and Company, Wilmington, Del., USA, under registered trademark and trademark. In another example, the coating binder component can be a UV primer, such as DuPont™ A-3130S™ UVA Primer-Surfacer, available from E. I. du Pont de Nemours and Company, Wilmington, Del., USA, under registered trademark and trademark. Latex primers can also be suitable.

The coating composition can further comprise one or more pigments, one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof. Typical organic, inorganic solvents or a combination thereof can be suitable. Examples of solvents can include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof. Some commercial available solvents, such as Oxsol® 100 available from MANA, New York, N.Y., USA, under respective registered trademark, can also be used.

The coating binder component can be a 1K waterborne coating composition. The coating binder can comprise in a range of from about 20% to about 90% of water in one example, about 20% to about 80% of water in another example, about 20% to about 60% of water in yet another example, about 20% to about 40% of water in yet another example and about 20% to about 30% of water in yet another example, percentage based on the total weight of the coating binder component. The coating composition can be a primer coating composition, such as a 1K waterborne primer coating composition.

The coating composition can further comprise one or more pigments, one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof. The coating composition can comprise anti-corrosion pigments, such as when it is used as a primer. The coating composition can comprise color pigments, effect pigments including gonioapparent pigments, or a combination thereof, such as when it is used as a basecoat or a colored topcoat coating composition.

This disclosure is also directed to a multi-layer coating formed over a substrate. The multi-layer coating can comprise:

B1) a first coating layer formed over said substrate from a first coating composition comprising:

A1) a coating binder component comprising one or more film forming polymers;

A2) a polytrimethylene ether polyol having one or more crosslinkable functional hydroxyl groups;

wherein said polytrimethylene ether polyol is hydrophobic;

said coating binder component comprises in a range of from about 20% to about 90% of water, percentage based on the total weight of the coating binder component; and said first coating composition is essentially free from crosslinking functional groups that react with said crosslinkable functional hydroxyl groups to form a crosslinked structure; and B2) a second coating layer formed over said first coating layer from a second coating composition comprising:

(b1) a crosslinkable component comprising one or more subsequent film forming polymers comprising one or more subsequent crosslinkable functional groups;

(b2) a crosslinking component comprising one or more crosslinking functional groups that react with said crosslinkable functional hydroxyl groups and said subsequent crosslinkable functional groups;

wherein said one or more film forming polymers and said one or more subsequent film forming polymers are the same or different, and said crosslinkable functional hydroxyl groups and said subsequent crosslinkable functional groups are the same or different.

The second coating composition can be a 2K basecoat coating composition, such as selected from a 2K waterborne coating composition or a 2K solvent borne coating composition.

The multi-layer coating can further comprise:

B3) a third coating layer formed over said second coating layer from a third coating composition; and wherein said second coating composition and said third coating composition are the same or different.

The first coating layer can be a primer layer or a basecoat layer. The second coating layer can be a basecoat layer or a clearcoat layer. The third coating layer can be a subsequent basecoat layer or a clearcoat layer. In one example, the first coating layer can be a primer layer and the second coating layer can be a basecoat layer. In another example, the first coating layer can be a basecoat layer and the second coating layer can be a clearcoat layer or a subsequent basecoat layer. In this example, the first coating layer can be formed over an existing primer layer or directly over a substrate. The basecoat layer and the subsequent basecoat layer can be formed from the same or different basecoat coating compositions. In yet another example, the third coating layer can be a clearcoat layer.

The first coating composition can further comprise one or more pigments, one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof. The first coating composition can comprise anti-corrosion pigments, such as when it is used as a primer. The second coating composition can comprise color pigments, effect pigments including gonioapparent pigments, or a combination thereof, such as when it is used as a basecoat or a colored topcoat coating composition.

The one or more film forming polymers and the one or more subsequent film forming polymers can be the same or different and each can comprise one or more acrylic polymers, one or more polyester polymers, or a combination thereof. The film forming polymers can comprise one or more crosslinkable functional groups, such as hydroxyl groups. In one example, the first coating composition and the second coating composition can both comprise the same film forming polymers, such as one or more acrylic polymers, one or more polyester polymers, or a combination thereof. The film forming polymers in the first coating composition can be modified for formulating into a waterborne coating composition. The film forming polymers in the first coating composition can also be emulsified or otherwise formulated into a waterborne coating composition. The film forming polymers in the second coating composition can be modified or un-modified for formulating into a 2K waterborne coating composition or a 2K solvent borne coating composition. In another example, the film forming polymers and the one or more subsequent film forming polymers can be different.

The crosslinkable functional hydroxyl groups and the subsequent crosslinkable functional groups can be the same or different. In one example, the crosslinkable functional hydroxyl groups and the subsequent crosslinkable functional groups can be the same crosslinkable functional hydroxyl groups selected from primary hydroxyl groups, secondary hydroxyl groups, or a combination thereof. In another example, the crosslinkable functional hydroxyl groups and the subsequent crosslinkable functional groups can be different, such as one can be a primary hydroxyl group and the other can be a secondary hydroxyl group. In yet another example, the crosslinkable functional hydroxyl groups and the subsequent crosslinkable functional groups can be different crosslinkable functional groups, such as one or more crosslinkable functional groups selected from hydroxyl, thiol, carboxyl, primary amine, secondary amine, or a combination thereof.

The crosslinking component can comprise one or more isocyanate crosslinking functional groups. The isocyanate crosslinking functional groups disclosed herein can be suitable. Organic polyisocyanates include aliphatic polyisocyanates, cycloaliphatic polyisocyanates, aromatic polyisocyanates and isocyanate adducts can be suitable.

As disclosed above, the polytrimethylene ether polyol can have a Mn in a range of from about 500 to about 10,000, a Tg of about −77° C. and a hydroxyl number in a range of from 10 to 225.

In the multi-layer coating disclosed herein, the second coating composition can be selected from a waterborne basecoat coating composition or a solvent borne basecoat coating composition. In one example, the second coating composition can be a waterborne basecoat coating composition. In another example, the second coating composition can be a solvent borne basecoat coating composition.

Any clearcoat coating composition can be suitable. Commercial clearcoat coating compositions, such as waterborne clearcoats, solvent borne clearcoats, radiation curing clearcoats, or a combination thereof, can be suitable. In one example, the clearcoat layer can be formed from one or more layers of the same clearcoat coating compositions. In another example, the clearcoat layer can be formed from one or more layers of difference clearcoat coating compositions.

This disclosure is further directed to a coated substrate comprising a substrate and any of the aforementioned multi-layer coatings formed over the substrate. The substrate can be a vehicle, a vehicle part, or a combination thereof.

This disclosure is also directed to a process for forming a multiplayer coating over a substrate. The process can comprise the steps of:

C1) applying a first coating composition over the substrate to form a first coating layer, the first coating composition comprising:

A1) a coating binder component comprising one or more film forming polymers;

A2) a polytrimethylene ether polyol having one or more crosslinkable functional hydroxyl groups;

wherein said polytrimethylene ether polyol is hydrophobic;

said coating binder component comprises in a range of from about 20% to about 90% of water, percentage based on the total weight of the coating binder component; and said first coating composition is essentially free from crosslinking functional groups that react with said crosslinkable functional hydroxyl groups to form a crosslinked structure;

C2) applying a second coating composition over said first coating layer to form a second coating layer, said second coating composition comprising:

(b1) a crosslinkable component comprising one or more subsequent film forming polymers comprising one or more subsequent crosslinkable functional groups;

(b2) a crosslinking component comprising one or more crosslinking functional groups that react with said crosslinkable functional hydroxyl groups and said subsequent crosslinkable functional groups;

wherein said one or more film forming polymers and said one or more subsequent film forming polymers are the same or different, and said crosslinkable functional hydroxyl groups and said subsequent crosslinkable functional groups are the same or different.

As disclose above, the second coating composition can be selected from a 2K waterborne coating composition or a 2K solvent borne coating composition. The first coating layer can be a primer layer or a basecoat layer.

The process can further comprise the step of curing said first coating layer and said second coating layer sequentially or simultaneously.

The process can further comprise the step of:

C3) applying a third coating composition over said second coating layer to form a third coating layer; and wherein said second coating composition and said third coating composition are the same or different.

As disclosed above, the second coating layer can be a basecoat layer formed from a 2K basecoat coating composition. The third coating layer can be a basecoat layer formed from the same or different basecoat coating compositions or a clearcoat layer formed from a clearcoat coating composition.

The aforementioned coating layers can be applied and cured sequentially so that each of the coating layers can be applied and cured before the next coating layer is applied thereover. The process can further comprise the step of curing the first coating layer, the second coating layer and the third coating layer sequentially. The process can also comprise the steps of curing two or more of the first coating layer, the second coating layer and the third coating layer simultaneously. In one example, the first coating layer and the second coating layer can be applied wet over wet and cured simultaneously. In another example, the second coating layer and the third coating layer can be applied wet over wet and cured simultaneously. In yet another example, the first, the second and the third coating layers can be applied wet on wet and cured simultaneously. The coating layers can be cured at a temperature in a range of from about 15° C. to about 220° C. In one example, a primer layer and a basecoat layer can be applied and cured sequentially at a temperature in a range of from about 15° C. to about 100° C. In another example, a primer layer and a basecoat layer can be applied wet on wet and cured simultaneously at a temperature in a range of from about 15° C. to about 100° C.

Suitable polytrimethylene ether diol can be prepared by an acid-catalyzed polycondensation of 1,3-propanediol, such as described in U.S. Pat. Nos. 6,977,291 and 6,720,459. The polytrimethylene ether diol can also be prepared by a ring opening polymerization of a cyclic ether, oxetane, such as described in J. Polymer Sci., Polymer Chemistry Ed. 28, 449 to 444 (1985). The polycondensation of 1,3-propanediol is preferred over the use of oxetane since the diol is a less hazardous, stable, low cost, commercially available material and can be prepared by use of petro chemical feed-stocks or renewable resources.

A bio-route via fermentation of a renewable resource can be used to obtain the 1,3-propanediol. One example of renewable resources is corn since it is readily available and has a high rate of conversion to 1,3-propanediol and can be genetically modified to improve yields to the 1,3-propanediol. Examples of typical bio-route can include those described in U.S. Pat. No. 5,686,276, U.S. Pat. No. 5,633,362 and U.S. Pat. No. 5,821,092. Bio-resourced polytrimethylene ether polyol can be produced from the aforementioned bio-routes.

Copolymers of polytrimethylene ether diol also can be suitable for the coating composition of this disclosure. Examples of such suitable copolymers of polytrimethylene ether diol can be prepared by copolymerizing 1,3-propanediol with another diol, such as, ethane diol, hexane diol, 2-methyl-1,3-propanediol, 2,2-dimethyl-1,3-propanediol, trimethylol propane and pentaerythritol. In one example, the copolymers of polytrimethylene ether diol can be polymerized from monomers have 1,3-propanediol in a range of from 50% to 99%. In another example, the copolymers of polytrimethylene ether diol can be polymerized from monomers have 1,3-propanediol in a range of from about 60% to about 99%. In yet another example, the copolymers of polytrimethylene ether diol can be polymerized from monomers have 1,3-propanediol in a range of from about 70% to about 99%.

The coating binder component, the second coating composition, the clearcoat coating composition, or a combination thereof can comprise polymers including linear or branched acrylic polymers, linear or branched polyesters, linear or branched acrylic polymers, or a combination thereof.

The acrylic polymer suitable for coating compositions can be suitable. These acrylic polymers can be straight chain polymers (also known as linear acrylic polymers), branched polymers, block copolymers, graft polymers, or other types of acrylic polymers. The acrylic polymer can comprise crosslinkable functional groups, such as, for example, hydroxyl, amino, amide, glycidyl, silane and carboxyl groups that are reactive with isocyanate or other crosslinking functional groups.

The acrylic polymers can be polymerized from a plurality of monomers, such as acrylates, methacrylates or derivatives thereof, as known to those skilled in the art and can be polymerized by free-radical copolymerization using conventional processes well known to those skilled in the art, for example, bulk, solution or bead polymerization, in particular by free-radical solution polymerization using free-radical initiators.

The polyester suitable for use herein can be linear polyesters. One example of suitable linear polyester can be the estrification product of neopentyl glycol, isophthalic acid, adipic acid, pentaerythritol and anhydride.

The polyester can also be highly branched copolyesters. The highly branched copolyester can be conventionally polymerized from a monomer mixture containing a dual functional monomer selected from the group consisting of a hydroxy carboxylic acid, a lactone of a hydroxy carboxylic acid and a combination thereof; and one or more hyper branching monomers. One example of a highly branched polyester suitable for use herein can be synthesized by reacting dimethylol propionic acid, pentaerythritol, and caprolactone. Conventional methods for synthesizing polyesters are known to those skilled in the art. Examples of the conventional methods can include those described in U.S. Pat. No. 5,270,362 and U.S. Pat. No. 6,998,154. For the second coating composition, the polyester can further comprise crosslinkable functional groups, such as, for example, hydroxyl, amino, amide, glycidyl, silane and carboxyl groups that are reactive with isocyanate or other crosslinking functional groups.

The second coating compositions can comprise a crosslinking component comprising compounds having crosslinking functional groups. Examples of such compounds can be organic polyisocyanates. Examples of organic polyisocyanates include aliphatic polyisocyanates, cycloaliphatic polyisocyanates, aromatic polyisocyanates and isocyanate adducts. Any isocyanate suitable for coating can be used.

Examples of suitable aliphatic, cycloaliphatic and aromatic polyisocyanates that can be used include the following: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine. Also, any of the aforementioned polyisocyanates can be used with a polyol to form an adduct. Polyols, such as, trimethylol alkanes, particularly, trimethylol propane or ethane can be used to form an adduct.

Although 2k coating compositions are disclose above, depending upon the type of crosslinking agent, the second coating composition can also be formulated as one-pack (1K) or two-pack (2K) coating composition. In one example, the second coating composition can be a two-pack coating composition comprising polyisocyanates with free isocyanate groups. In another example, the second coating composition can be a one-pack (1K) coating composition comprising blocked polyisocyanates that can be unblocked to react with the crosslinkable functional hydroxyl groups.

Typically, the second coating composition can also include a catalyst to reduce curing time and to allow curing of the coating composition at ambient temperatures. The ambient temperatures are typically referred to as temperatures in a range of from 18° C. to 35° C. Typical catalysts include organic metal salts, such as, dibutyl tin dilaurate, dibutyl tin diacetate, dibutyl tin dichloride, dibutyl tin dibromide, zinc naphthenate; compounds containing tertiary amino groups, such as, triethylamine; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

The second coating composition can comprise one or more solvents. Examples of solvents can include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof.

Typically, the second coating composition can contain conventional inorganic and organic colored pigments, metallic flakes and powders, such as, aluminum flake and aluminum powders; special effects pigments, such as, coated mica flakes, coated aluminum flakes colored pigments, or a combination thereof can be used.

The coating binder component or the second coating composition can also comprise one or more ultraviolet light stabilizers. Examples of such ultraviolet light stabilizers can include ultraviolet light absorbers, screeners, quenchers, and hindered amine light stabilizers. An antioxidant can also be added to the coating composition.

Typical ultraviolet light absorbers can include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Typical hindered amine light stabilizers can include N-(1,2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N, N'-dibutyl-N',N'-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl) methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-21-oxo-7-oxa-3, 20-diazal dispiro(5.1.11.2)henicosan-20-yl)propionate.

Typical antioxidants can include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl)phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-C7-C9 branched alkyl esters. Typically useful antioxidants can also include hydroperoxide decomposers, such as Sanko® HCA (9,10-dihydro-9-oxa-10-phosphenanthrene-10-oxide), triphenyl phosphate and other organophosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

The second coating composition can comprise conventional coating additives. Examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective registered trademarks, leveling agents based on (meth)acrylic homopolymers; rheological control agents; thickeners, such as partially crosslinked polycarboxylic acid or polyurethanes; and antifoaming agents. The additives can be used in conventional amounts familiar to those skilled in the art.

As disclosed herein, the coating binder component can comprise in a range of from about 20% to about 90% of water in one example, in a range of from about 40% to about 80% of water in another example, percentage based on total weight of the coating binder component. The coating binder component can also comprise one or more organic solvents or one or more reactive diluents. Although water miscible organic solvent can be preferred, any typical organic solvents can be used to form the coating binder component. The coating binder component can comprise one or more detergents or emulsion agents.

The coating composition can be applied using known processes, such as spraying, electrostatic spraying, dipping, brushing, rolling, or flow coating. In the context of vehicle coating, the coating composition can be used both for vehicle original equipment manufacturing (OEM) coating and for repairing or refinishing coatings of vehicles and vehicle parts. Curing of the coating composition can be accomplished at ambient temperatures, such as temperatures in a range of from about 18° C. to about 35° C., or at elevated temperatures, such as at temperatures in a range of from about 35° C. to about 150° C. Typical curing temperatures of about 20° C. to about 80° C., in particular of about 20° C. to about 60° C., can be used.

Applicants unexpectedly discovered that adding hydrophobic polytrimethylene ether polyol into a waterborne coating composition can provide better inter-layer adhesion, especially when next coating layer is produced from a different coating composition comprising crosslinking functional groups that react with hydroxyl groups. Such effects are unexpected since hydrophobic polytrimethylene ether polyol are insoluble in waterborne coating compositions and are therefore not desirable in such waterborne coating compositions.

The substrate suitable in this disclosure can include, but not limited to: treated metal; bare metal such as blasted steel; aluminum or other metal or alloys; plastic, such as sheet molded composite (SMC), Reaction Injection Molding (RIM), thermoplastic olefins (TPO) or other resinous materials; glass, concrete, fiberglass, rock, stone or other manmade or nature materials. The substrate can also include consumer electronics such as call phones, TV, digital game devices, telephone set; consumer appliances, such as refrigerator, washing machine, dishwasher, or microwave set; sporting goods, such as ski board, bike, and other sport equipments; tools and instruments, such as hand tools, machines, or other devices; a vehicle body or vehicle body parts; steel tanks; metal or plastic pipelines; buildings, window frames, guard rails, or other residential or industrial structures.

TESTING PROCEDURES

Persoz Hardness Test—the change in film hardness of the coating was measured with respect to time after application by using a Persoz Hardness Tester Model No. 5854 [ASTM D4366] supplied by Byk-Mallinckrodt, Wallingford, Conn. The measurement is in second.

Tg (glass transition temperature) of the polytrimethylene ether polyolcan be determined using differential scanning calorimeter (DSC).

Molecular weight and hydroxyl number of the polytrimethylene ether polyol are determined according to ASTM E222.

Molecular weights Mw and Mn and the polydispersity (Mw/Mn) of the acrylic polymer and other polymers are determined by GPC (Gel Permeation Chromatography) using polystyrene standards and tetrahydrofuran as the solvent.

Adhesion test is determined based on ASTM D-1541.

Water solubility of the polytrimethylene ether polyol can be determined by mixing equal volumes of a polytrimethylene ether polyol and water in a vial and then letting the vial stand still for a period of time in a range of from 5 to 20 minutes. If the polytrimethylene ether polyol and water separate into layers, then the polytrimethylene ether polyol can be determined as hydrophobic. If no separate layers are formed, the polytrimethylene ether polyol can be determined as hydrophilic.

EXAMPLES

The various embodiments are further defined in the following Examples. It should be understood that these Examples, while indicating preferred embodiments, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Primer coating compositions were produced based on Table 1. The primers were applied over test panels made from blasted steel available from East Coast Steel Inc, Columbia, S.C. 29290, USA, to form primer layer having a dry thickness in a range of from of 50 to 100 micrometers. The primer layers were cured for 24 hours.

TABLE 1

Coating Compositions (weight in grams).s and Properties.

| | Comp Ex 1 | Comp Ex 2 | Comp Ex 3 | Comp Ex 4 | Example 1 | Example 2 |
|---|---|---|---|---|---|---|
| Waterborne primer [1] | 100 | 95 | 90 | 0 | 95 | 90 |
| Solventborne primer [2] | 0 | 0 | 0 | 90 | 0 | 0 |
| Propylene glycol methyl ether [3] | 0 | 5 | 0 | 0 | 0 | 0 |
| Hydrophobic polytrimethylene ether diol [4] | 0 | 0 | 0 | 10 | 5 | 10 |
| Arcol ® PPG-2000 [5] | 0 | 0 | 10 | 0 | 0 | 0 |
| Total Weight | 100 | 100 | 100 | 100 | 100 | 100 |

[1] The waterborne coating binder used was Imron ® 1.5 PR ™ (1-component waterborne primer), available from E. I. du Pont de Nemours and Company, Wilmington, Delaware, USA, under respective trademarks and registered trademarks. Imron ® 1.5 PR ™ contains about 55% of water and can be further thinned with water to adjust viscosity. Specific weight of the Imron ® 1.5 PR ™ is about 9.6 kg/gallon (1.15 kg/liter) at 55% of water, based on the total weight of the Imron ® 1.5 PR ™.
[2] The solvent borne coating binder used was Tufcote ® 3.5 PR ™ (1-component solventborne primer), available from E. I. du Pont de Nemours and Company, Wilmington, Delaware, USA, under respective trademarks and registered trademarks.
[3] Propylene glycol methyl ether is available as Dowanol ™ PM propylene glycol methyl ether from Dow Chemical, Midland, MI, USA, under respective trademark.
[4] The Hydrophobic polytrimethylene ether diol used was Cerenol ® H-2000, available from E. I. du Pont de Nemours and Company, Wilmington, Delaware, USA, under respective trademarks and registered trademarks.
[5] Arcol ® PPG-2000 is a compound having secondary hydroxyl groups, available from Bayer, Pittsburgh, PA, USA, under respective trademarks and registered trademarks.

A solvent borne Topcoat 9T01™ available from E. I. du Pont de Nemours and Company, Wilmington, Del., USA, under respective trademark, was applied over the dried primer layers and cured for 24 hours at about 20° C. Hardness test was performed according to ASTM D4366. Adhesion test was performed according to ASTM D-1541.

TABLE 2

Coating Properties.

| | Comp Ex 1 | Comp Ex 2 | Comp Ex 3 | Comp Ex 4 | Example 1 | Example 2 |
|---|---|---|---|---|---|---|
| Persoz hardness [sec] | 60 | 52 | 12 | 30 | 30 | 20 |
| Adhesion between the primer layer and the Topcoat layer | 2 | 2 | 1 | 3 | 5 | 5 |

As demonstrated above, the coating compositions of the examples had improved inter-layer adhesions. The coating layers also had increased overall flexibility. The hydrophobic polytrimethylene ether diol did not show improvement in a solvent borne coating binder.

What is claimed is:

1. A coating composition comprising:
   a coating binder component comprising a film forming polymer and water, wherein the coating binder component comprises from about 20% to about 90% of water, percentage based on the total weight of the coating binder component, and wherein the coating binder component is a 1K waterborne coating composition;
   a crosslinking component comprising a crosslinking functional group; and
   a bio-resourced hydrophobic polytrimethylene ether polyol having a crosslinkable functional hydroxyl group, wherein the bio-resourced hydrophobic polytrimethylene ether polyol is a branched polytrimethylene ether triol or a branched copolyether polyol, and wherein the polytrimethylene ether polyol has a Mn in a range of from about 500 to about 10,000, a Tg of about −77° C. and a hydroxyl number in a range of from 10 to 225;
   wherein the crosslinking functional group reacts with the crosslinkable functional hydroxyl group, wherein the coating composition includes excess amounts of the crosslinkable functional hydroxyl group of the bio-resourced hydrophobic polytrimethylene ether polyol not reacted with the crosslinking functional groups in the crosslinking component, wherein a molar ratio of the crosslinking functional group/crosslinkable functional hydroxyl group of the polytrimethylene ether polyol is from about 0 to about 0.5, and wherein the coating composition is essentially free from crosslinking functional groups that react with the crosslinkable functional hydroxyl groups to form a crosslinked structure.

2. The coating composition of claim 1, wherein the bio-resourced hydrophobic polytrimethylene ether polyol is a branched polytrimethylene ether triol.

3. The coating composition of claim 1, wherein the bio-resourced hydrophobic polytrimethylene ether polyol is a branched copolyether polyol.

4. The coating composition of claim 1, wherein the bio-resourced hydrophobic polytrimethylene ether polyol is a branched copolyether polyol derived via condensation reaction from a monomer mixture comprising 1,3-propanediol and at least one triol comonomer selected from 1,1,1- trishydroxymethyl ethane, 1,1,1-trishydroxymethyl propane, or a combination thereof.

5. A multi-layer coating formed over a substrate, said multi-layer coating comprising:
a first coating layer formed over said substrate from a first coating composition comprising:
a coating binder component comprising a film forming polymer;
a bio-resourced polytrimethylene ether polyol having a crosslinkable functional hydroxyl group; wherein said bio-resourced polytrimethylene ether polyol is hydrophobic; wherein said coating binder component comprises in a range of from about 20% to about 90% of water, percentage based on the total weight of the coating binder component;
crosslinking functional groups that react with the crosslinkable functional hydroxyl groups to form a crosslinked structure, wherein the molar ratio of the crosslinking functional groups/crosslinkable functional hydroxyl groups of the bio-resourced polytrimethylene ether polyol are from 0 to about 0.5; and
a second coating layer formed over said first coating layer from a second coating composition comprising:
a crosslinkable component comprising a subsequent film forming polymer comprising a subsequent crosslinkable functional group; and
a crosslinking component comprising a crosslinking functional group that reacts with said crosslinkable functional hydroxyl group of the first coating layer and said subsequent crosslinkable functional group; wherein said film forming polymer and said subsequent film forming polymer are different, wherein said crosslinkable functional hydroxyl group and said subsequent crosslinkable functional group are different; and
wherein said second coating composition is different from said first coating composition.

6. The multi-layer coating of claim 5, wherein said second coating composition is selected from a 2K waterborne coating composition or a 2K solvent borne coating composition.

7. The multi-layer coating of claim 5, wherein said first coating layer is a primer layer or a basecoat layer.

8. The multi-layer coating of claim 5 wherein the first coating composition further comprises a crosslinking component comprising a crosslinking functional group, wherein the crosslinking functional group reacts with the crosslinkable functional hydroxyl group, and wherein the coating composition includes excess amounts of the crosslinkable functional hydroxyl group of the bio-resourced polytrimethylene ether polyol not reacted with the crosslinking functional groups in the crosslinking component.

9. The multi-layer coating of claim 5, wherein said crosslinking component comprises an isocyanate crosslinking functional group.

10. The multi-layer coating of claim 5, wherein the bio-resourced polytrimethylene ether polyol has a Mn in a range of from about 500 to about 10,000, a Tg of about −77° C. and a hydroxyl number in a range of from 10 to 225.

11. The multi-layer coating of claim 5 wherein the crosslinking functional groups in the first coating composition comprise isocyanate groups.

12. A process for forming a multi-layer coating over a substrate, said process comprising the steps of:
producing a bio-resourced hydrophobic polytrimethylene ether polyol having a crosslinkable functional hydroxyl group via fermentation of a renewable resource;
applying a first coating composition over said substrate to form a first coating layer, said first coating composition comprising:
a coating binder component comprising a film forming polymer and water, wherein the coating binder component comprises from about 20% to about 90% of water, percentage based on the total weight of the coating binder component;
a crosslinking component comprising a crosslinking functional group; and
the bio-resourced hydrophobic polytrimethylene ether polyol having the crosslinkable functional hydroxyl group;
wherein the crosslinking functional group reacts with the crosslinkable functional hydroxyl group, and wherein the coating composition includes excess amounts of the crosslinkable functional hydroxyl group of the bio-resourced hydrophobic polytrimethylene ether polyol not reacted with the crosslinking functional groups in the crosslinking component, wherein the molar ratio of the crosslinking functional group/crosslinkable functional hydroxyl group of the bio-resourced hydrophobic polytrimethylene ether polyol are between 0 and about 0.5;
applying a second coating composition over said first coating layer to form a second coating layer, said second coating composition comprising:
a crosslinkable component comprising a subsequent film forming polymer comprising a subsequent crosslinkable functional group; and
a crosslinking component comprising a crosslinking functional group that reacts with said crosslinkable functional hydroxyl group and said subsequent crosslinkable functional group;
wherein said film forming polymer and said subsequent film forming polymer are the same or different, and
said crosslinkable functional hydroxyl group and said subsequent crosslinkable functional group are the same or different.

13. The process of claim 12, wherein said second coating composition is selected from a 2K waterborne coating composition or a 2K solvent borne coating composition.

14. The process of claim 12, wherein said first coating layer is a primer layer or a basecoat layer.

15. The process of claim 12 further comprising the step of curing said first coating layer and said second coating layer sequentially or simultaneously.

16. The process of claim 12 further comprising the step of:
C3) applying a third coating composition over said second coating layer to form a third coating layer; and
wherein said second coating composition and said third coating composition are the same or different.

17. The process of claim 16, wherein said second coating layer is a basecoat layer formed from a 2K basecoat coating composition and said third coating layer is a clearcoat layer formed from a clearcoat coating composition.

18. The process of claim 16 further comprising the step of curing said first coating layer, said second coating layer and said third coating layer sequentially, or curing two or more of said first coating layer, said second coating layer and said third coating layer simultaneously.

19. The process of claim 12 wherein the film forming polymer and the subsequent film forming polymer are different.

20. The process of claim 12 wherein the film forming polymer and the subsequent film forming polymer are different, and wherein the crosslinkable functional hydroxyl group and the subsequent crosslinkable functional group are the same.

\* \* \* \* \*